United States Patent [19]
Senator et al.

[11] Patent Number: 5,983,283
[45] Date of Patent: Nov. 9, 1999

[54] STORAGE MANAGER INDEPENDENT CONFIGURATION INTERFACE TRANSLATOR AND METHOD

[75] Inventors: Steven T. Senator; Dale R. Passmore, both of Colorado Springs; Robert S. Gittins, Woodland Park, all of Colo.

[73] Assignee: Sun Microsystems, Inc., Palo Alto, Calif.

[21] Appl. No.: 08/632,217

[22] Filed: Apr. 15, 1996

[51] Int. Cl.$^6$ .................................................. G06F 9/44
[52] U.S. Cl. .......................................... 709/301; 711/114
[58] Field of Search .................................. 395/680, 681; 709/300, 301; 711/114

[56] References Cited

U.S. PATENT DOCUMENTS

| | | | |
|---|---|---|---|
| 5,363,487 | 11/1994 | Willman et al. | 395/275 |
| 5,455,934 | 10/1995 | Holland et al. | 395/404 |
| 5,511,227 | 4/1996 | Jones | 395/829 |
| 5,530,960 | 6/1996 | Parks et al. | 395/825 |
| 5,553,233 | 9/1996 | Ikeda | 395/182.11 |
| 5,802,364 | 4/1996 | Senator et al. | 395/681 |
| 5,809,303 | 10/1995 | Senator | 395/681 |

OTHER PUBLICATIONS

Computer Technology Review, vol. 15, No. 11, Nov. 1995, Los Angeles, CA, pp. 50–52, "Client/Server, GUI Software Simplifies RAID Management".

Computer Technology Review, vol. 12, No. 11, Sep. 1993, Los Angeles, CA, pp. 46–49, "Beyond HSM: Data Management In The Native Environment".

IBM Technical Disclosure Bulletin, vol. 38, No. 5, May 1995, Armonk, NY, pp. 151–152, "Supporting Removable Storage Media Which Has Multiple Partitions".

Drapeau et al., "RAID–II A High–Bandwidth Network File Server", IEEE, pp. 234–244, 1994.

Baker, Steven, "Journaling file systems: advanced network file systems offer journaling for fast recovery, greater integrity and reliability, and faster I/O. (Interoperability supplement to LAN Magazine)", LAN Magazine, v9, n10, pS59(9), Oct. 1994.

Jolitz, William Frederick; Jolitz, Lynne Greer, "Porting UNIX to the 386: the basic kernel", Dr. Dobb's Journal, v16, n11, p46(9), Nov. 1991.

Baker, Steve, "UnixWare", UNIX Review, v11, n5, p66(7), May 1993.

Primary Examiner—Alvin E. Oberley
Assistant Examiner—St. John Courtenay, III
Attorney, Agent, or Firm—William J. Kubida; Francis A. Sirr; Holland & Hart LLP

[57] ABSTRACT

A system, method and computer program product comprising a storage manager independent configuration interface translator which requests an opaque listing of the available storage devices from an associated metadisk driver and determines a subset of the listing meeting a preselected search criteria. The resultant opaque listing is then converted to a non-opaque format listing for presentation to a user of the computer system in a desired format such as through a command line or graphical user interface. A notification mechanism is also provided that presents information about storage devices which have in some way changed while in use.

11 Claims, 2 Drawing Sheets

5,983,283

STORAGE MANAGER INDEPENDENT CONFIGURATION INTERFACE TRANSLATOR AND METHOD

CROSS REFERENCE TO RELATED APPLICATIONS

The present invention is related to the subject matter of United States Pat. No. 5,802,364 for "Metadevice Driver Rename/Exchange Technique for a Computer System Incorporating a Plurality of Independent Device Drivers" and Ser. No. 08/632,546 for "Event Notification in a Computing System Having a Plurality of Storage Devices" filed on even date herewith and assigned to Sun Microsystems, Inc., assignee of the present invention, the disclosures of which are hereby specifically incorporated herein by this reference.

BACKGROUND OF THE INVENTION

The present invention relates, in general, to the field of computers and computer operating systems for operatively controlling a plurality of computer mass storage device drivers coupled to a computer operating system through a metadevice or metadisk driver. More particularly, the present invention relates to a system, method and computer program product comprising a storage manager independent configuration interface translator Currently available storage manager programs for computer systems are generally release dependent. That is, they must be expressly designed for use with particular releases of an associated computer operating system. Moreover, existing storage manager programs have generally been tied to a particular developer's operating system and have not been able to function as an extensible, generic storage management product to apprise a user of the storage devices available for use and their configuration as part of larger groups of storage devices. Still further, existing programs have not been able to provide an acceptable notification mechanism for queuing any changes in the status of the underlying storage devices.

SUMMARY OF THE INVENTION

The present invention advantageously provides an extensible, generic interface to a computer mass storage management system that presents a catalog, or listing, of storage devices available for use and their configuration, whether as part of a redundant array of inexpensive disks ("RAID"), mirrored set or other groups (or sets) of devices. It also conveniently provides an event notification mechanism to present information about any changes in the identity, configuration, status or utilization by other hosts of the underlying storage devices. In a preferred embodiment, the present invention may be implemented as a portion of the Solstice™ DiskSuite™ program and may also be utilized in conjunction with other available storage managers such as the Veritas™ volume manager and the IBM logical volume manager.

The storage manager independent configuration interface translator disclosed herein utilizes a group of opaque storage descriptors which may be queried by accessor functions to determine, for example, error conditions, device set relationships and the like. The storage descriptors each have an associated storage descriptor identifier ("SDID") which are linked and function as publicly accessible (i.e. non-opaque) keys by an associated command line interface ("CLI") or graphical user interface ("GUI").

In a specific embodiment disclosed herein is a method for computer mass storage management in a computer system incorporating a metadisk driver and associated database containing information corresponding to devices operatively controlled by metadrivers coupled to the metadisk driver. The method comprises the steps of requesting an opaque listing of the devices from the metadisk driver and determining a subset of the opaque listing of devices meeting a preselected search criteria. The subset of the opaque listing is converted to a non- opaque format listing and is presented to a user of the computer system.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
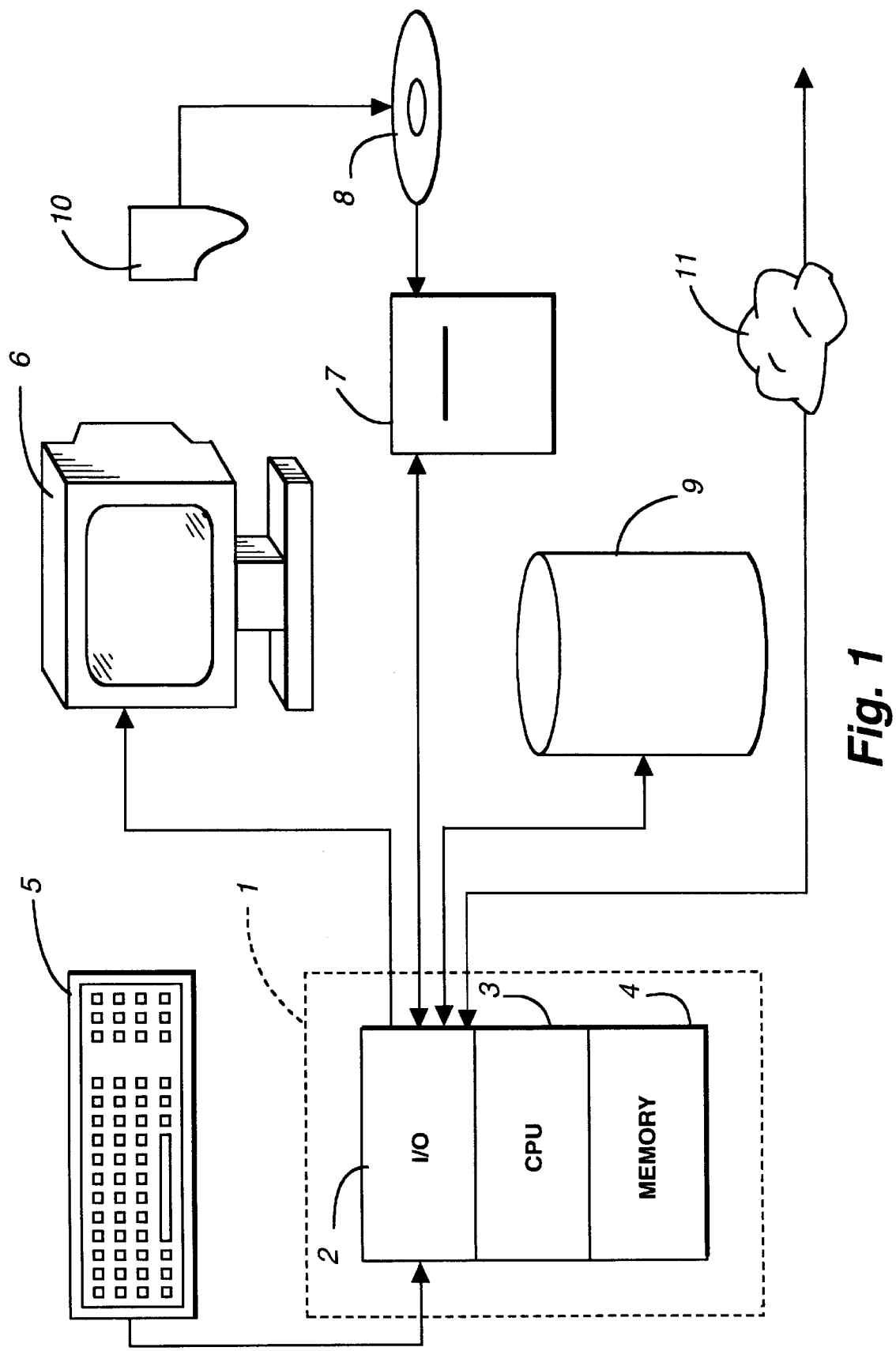
FIG. 1 is a simplified representational drawing of a general purpose computer forming a portion of the operating environment of the present invention.

The environment in which the present invention is used encompasses the general distributed computing system, wherein general purpose computers, workstations or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 may be connected to a keyboard 5, a display unit 6, a disk storage unit 9, a CDROM drive or unit 7 or a computer network 11 such as a wide area network ("WAN"), local area network ("LAN") or other network connection such as the Internet. The CDROM unit 7 can read a CDROM or CDROM medium 8 which typically contains programs 10 and data. The computer program products containing mechanisms to effectuate the apparatus and methods of the present invention may reside in the memory section 4, or on a disk storage unit 9 or on the CDROM 8 or network 11 of such a system.

Figure 2:
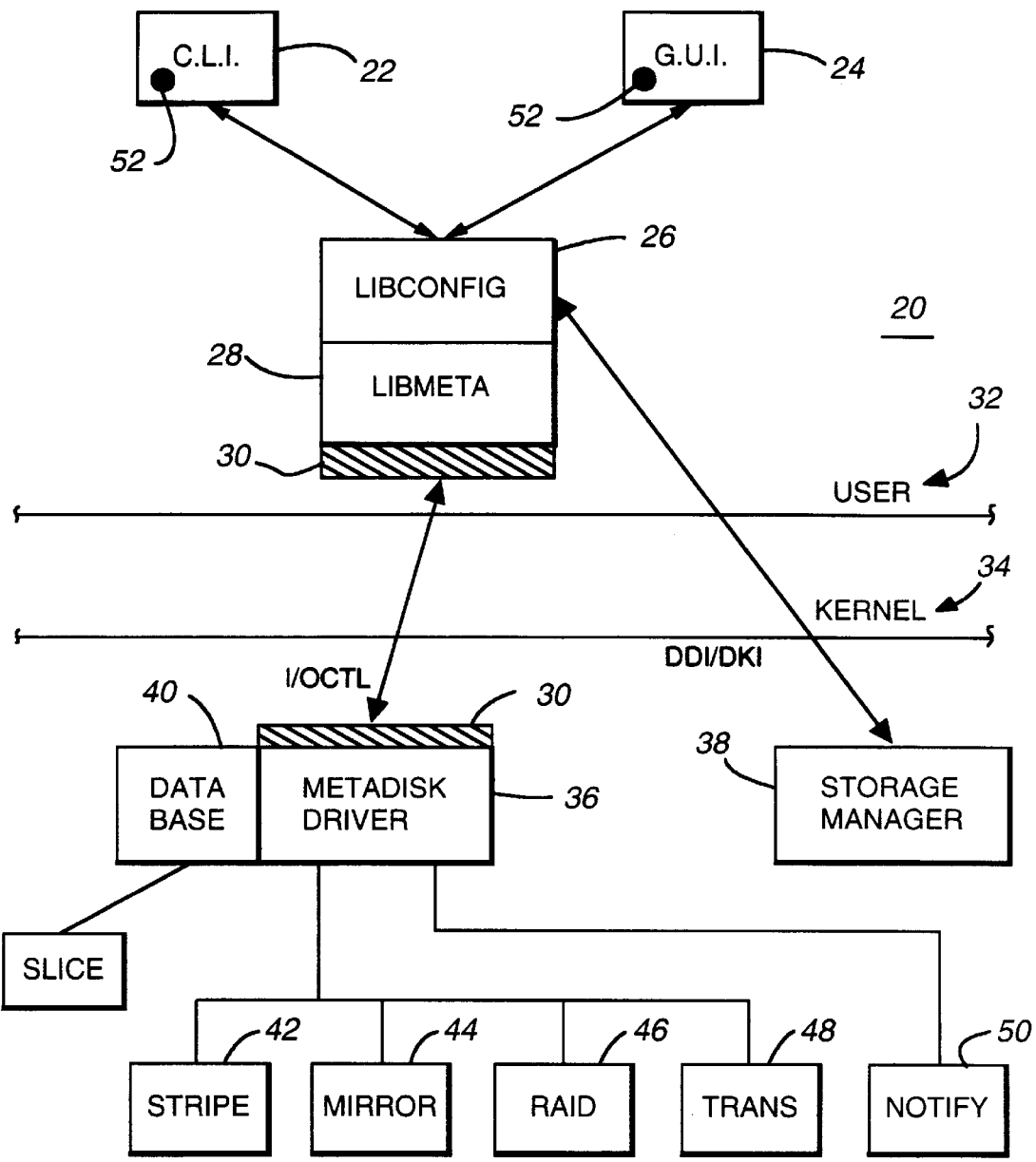
FIG. 2 is a simplified conceptual representation of an exemplary computer program operating system incorporating a storage manager independent library configuration ("libconfig") block for operative coupling to a plurality of metadrivers through a metadisk driver as herein disclosed.

With reference now to FIG. 2, a simplified conceptual representation of an exemplary computer program operating system 20 is shown. The computer operating system 20 incorporates a storage manager independent library configuration ("libconfig") block 26 which receives inputs and passes outputs to a command line interface ("CLI") 22 as well as a graphic user interface ("GUI") 24. The libconfig block 26 is designed to be storage manager independent and software release independent.

The libconfig block 26 interfaces with a libmeta block 28 which is subject to change dependant upon the requirements of a particular software release and is generally designed for a particular storage manager. In the illustration shown, libmeta block 28 includes a unique interface 30 for communication with a metadisk driver 36 having a similar interface 30. The libmeta block 28 and metadisk driver 36 communicate through the user 32 and kernel 34 layers of the operating system 20. As shown, the libconfig block 26, because it is storage manager independent, is able to communication directly with an alternative storage manager 38 in lieu of metadisk driver 36.

Metadisk driver 36 (which is more fully described in the co-pending patent applications referenced earlier) has an associated database 40 which may interface with a slice (or partition) of a storage device through a DDI/DKI interface in a UNIX™ based operating system 20, such as the Solaris™ operating system available from Sun Microsystems, Inc., assignee of the present invention.

The metadisk driver 36 overlies a number of metadrivers corresponding to various computer mass storage devices and configurations as shown. In this regard, a stripe metadriver 42, a mirror metadriver 44, a RAID metadriver 46 and a trans metadriver 48 may be used. It should be noted, however, that these various metadrivers 42–48 are merely exemplary and not intended to limit the types of metadrivers, layered drivers, or other computer mass storage drivers which might be utilized. The metadisk driver 36 also has an associated notify block 50. The notify block 50 functions as a rendezvous point for queued messages regarding storage device related events such as information about any changes in the identity, configuration, status or utilization by other hosts of the underlying storage devices.

Figure 3:
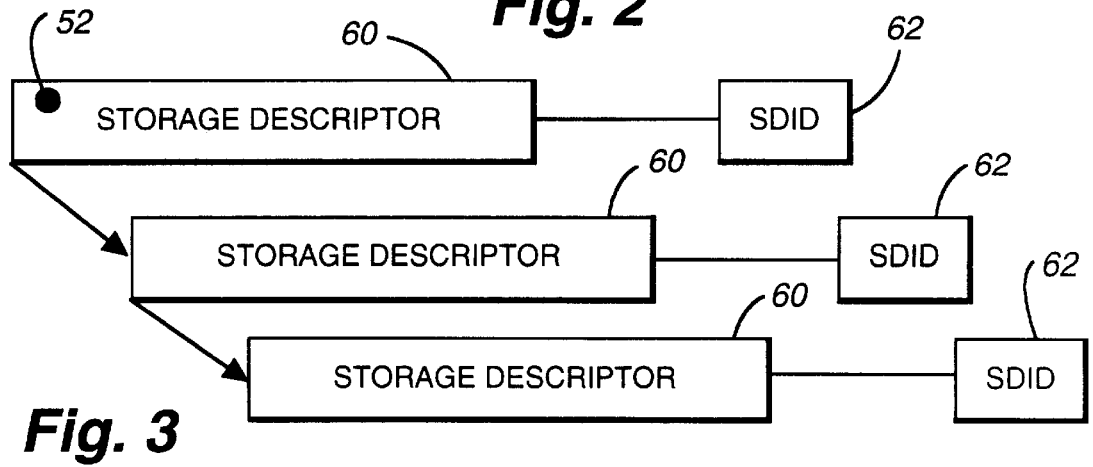
FIG. 3 is a simplified conceptual representation of a number of storage descriptors, each having an associated storage descriptor identifiers ("SDID"), which may be conceptually "anchored" to the command line interface ("CLI") or graphical user interface ("GUI") of FIG. 2.

With reference now to FIG. 3, a simplified conceptual representation of a number of opaque (or non-public) storage descriptors 60 is shown which may be coupled through a conceptual "anchor" 52 to the CLI 22 and GUI 24. The storage descriptors 60 each are associated with a publicly accessible (or non-opaque) storage descriptor identifier ("SDID") 62, as shown which function as keys and allow the CLI 22 or GUI 24 to view their contents through the mechanism of the anchor 52.

The following functions are described in greater detail to more fully illustrate the functionality of the storage manager independent configuration interface translator and method disclosed herein in conjunction with the particular implementation used in the Solstice™ DiskSuite™ 4.0 computer program developed and licensed by Sun Microsystems, Inc., assignee of the present invention. The initial listing which follows relates to a function which may be utilized for obtaining a set name list:

| | |
|---|---|
| NAME | cfg_get_setname_list, cfg_destroy_setname_list, - obtain or destroy a vector of set names for the local host |
| SYNOPSIS | #include <config.h><br>int cfg_get_setname_list(char ***et_name_list_p)<br>void cfg_destroy_setname_list(char **set_name list) |
| DESCRIPTION | These functions allocate or destroy a vector of set names that are known to the DiskSuite subsystem on the local host, respectively. |
| ARGUMENTS | set_name_list_p<br>This is the address of a vector of character strings which are allocated by cfg_get_ setname_list( ) and set equal to the names of sets which are defined on this host.<br>set_name_list<br>This is the vector of character strings which was allocated by cfg_get_setname_list( ). |
| RETURN VALUES | Upon success, a value of 0 is returned. Otherwise the return value is an errno, as in intro (2). |

The following functions relate to the construction of an opaque object list:

| | |
|---|---|
| NAME | cfg_getsd_by_id, cfg_getsd_by_setname, cfg_getsd_next, cfg_getsd_rewind, cfg_getsd_toplevel, cfg_destroy_sd - read and manipulate storage descriptors |
| SYNOPSIS | #include <config.h><br>int<br>cfg_getsd_by_id(sdid_t sdid, void **storage_descriptor_pp)<br>int<br>cfg_getsd_by_setname(char *setname, void **storage_descriptor_pp)<br>int<br>cfg_getsd_next(void **storage_descriptor_pp)<br>int<br>cfg_getsd_rewind(void **storage_descriptor_pp)<br>int<br>cfg_getsd_toplevel(sdid_t sdid, void **storage_descriptor_pp)<br>int<br>cfg_destroy_sd(void *storage_descriptor_p) |
| DESCRIPTION | These functions manipulate storage descriptors, storage descriptor identifiers and textual storage descriptors. Storage descriptors describe the objects which contain storage without exposing internal DiskSuite interfaces or data structures.<br>cfg_getsd_by_setname( )<br>sets its argument storage_descriptor_pp to refer to an allocated list of storage descriptor pointers. This list may be walked using cfg_getsd_next( ) or repositioned to the list head with cfg_getsd_rewind( ).<br>cfg_destroy_sd( )<br>deallocates the list that was allocated by cfg_getsd_by_setname( ).<br>cfg_getsd_by_id( )<br>is used reposition the storage descriptor list to the entry identified by sdid.<br>cfg_getsd_toplevel( )<br>is used to obtain the uppermost containing object. Since some objects are orphans, the appropriate set contains all such otherwise unattached objects<br>For normal storage devices, mirrors would contain the stripes which make up its sub-mirrors, for example.<br>cfg_getsd_next( )<br>is used to set storage_descriptor_pp to the next element in the list. At the end of the list it is set to NULL.<br>cfg_getsd_rewind( )<br>resets storage descriptor_pp to the |

| | |
|---|---|
| ARGUMENTS | beginning of the list. This is most useful just before calling cfg_destroy_sd( ).<br>setname<br>This is a NULL-terminated character string which identifies the set for which storage descriptors are to be obtained.<br>storage_descriptor_pp<br>This is the address of a void pointer which will be allocated by cfg_getsd_by_setname, manipulated by one of the following cfg_getsd_by_id, cfg_getsd_next, cfg_getsd_rewind, cfg_getsd_toplevel or de-allocated by cfg_destroy_sd<br>storage_descriptor_p<br>This is the current position of the storage_descriptor list as obtained from cfg_getsd_by_setname.<br>sdid<br>This is a public interface to the contents of a storage descriptor. Described fully in cfg_get_sdid, it is usually obtained from the event handling routines. |
| RETURN VALUES | Upon success these routines return 0. Upon an error, the appropriate error number from intro (2) is returned. |

The following functions determine the attributes of opaque objects and whether or not they are of interest:

| | |
|---|---|
| NAME | cfg_validate_sd, cfg_sd_is_err, cfg_sd_is_owned, cfg_sd_is_toplevel - check validity and attributes of a storage descriptor |
| SYNOPSIS | #include <config.h><br>int<br>cfg_sd_is_err(void *storage_descriptor_p)<br>int<br>cfg_sd_is_owned(void *storage_descriptor_p)<br>int<br>cfg_sd_is_toplevel(void *storage descriptor_p)<br>int<br>cfg_validate_sd(void *storage_descriptor_p) |
| DESCRIPTION | These functions check the validity or attributes of a given storage descriptor. |
| ARGUMENT | storage_descriptor_p<br>This is the current value of the storage descriptor list obtained from zone of cfg_getsd_by_id( ) or cfg_getsd_by_setname( ).<br>cfg_sd_is_err( )<br>returns TRUE (non-zero) if there is an error in the associated devices state.<br>cfg_sd_is_owned( )<br>returns TRUE (non-zero) if the storage descriptor refers to an object which may or may not be owned by a given host. These include objects of type MDSD_HOST and MDSD_SET.<br>cfg_sd_is_toplevel( )<br>returns TRUE (non-zero) if the storage descriptor refers to an object which is not contained by any other storage descriptor. Examples of top_level devices include the set |

| | |
|---|---|
| | entry and mirrors which contains sub-mirrors<br>cfg_validate_sd( )<br>may be used to verify the contents of a given storage_descriptor. This is useful to verify that wild pointers have not written over its contents and to verify that it hasn't been deallocated. It returns TRUE (non-zero) if the storage_descriptor_p is valid.<br>All of these routines return FALSE on any error condition. |

The following functions compare and retrieve the public identifiers ("SDID"):

| | |
|---|---|
| NAME | cfg_cmp_sdid, cfg_destroy_sdid, cfg_get_sdid, -_compare, allocate and deallocate storage descriptor identifiers |
| SYNOPSIS | #include <config.h><br>sdid_cmp_t<br>cfg_cmp_sdid(sdid_t s1, sdid_t s2)<br>int<br>cfg_get_sdid(void *storage-descriptor_p), sdid_t *sdidp)<br>int<br>cfg_destroy_sdid(sdid_t *sdidp) |
| DESCRIPTION | These functions manipulate storage descriptor identifiers, which are the public key to storage descriptors.<br>cfg_get_sdid ( )<br>translates the data within storage_descriptor_p and fills in the values into sdidp.<br>storage_descriptor_p may be obtained from one of the cfg_getsd_* functions.<br>cfg_destroy_sdid ( )<br>returns any memory that was allocated within the sdidp by cfg_get_sdid ( ). It does not deallocate<br>cfg_cmp_sdid ( )<br>allows sdid-t's to be compared. It returns one of the following enumerated types, according to the following type definition.<br>typedef enum sdid_compare {<br>SDIDCM_UNK,<br>SDIDCMP_NO,<br>SDIDCMP_EXACT,<br>SDIDCMP_STALE,<br>SDIDCMP_TYPE |
| } | sdid_cmp_t;<br>SDIDCMP_UNK<br>An error occurred while attempting to compare s1, and s2. No comparison was made.<br>SDIDCMP_NO<br>The two storage descriptor identifiers, s1, and s2, do not match.<br>SDIDCMP_EXACT<br>The two storage descriptor identifiers, s1, and s2, are identical.<br>SDIDCMP_STALE<br>The two storage descriptor identifiers describe the same object but the object is likely to have changed between the time when one or both of s1, and s2 were last checked against the driver's state.<br>SDIDCMP_TYPE<br>The two storage descriptor identifiers match only in type of |

```
                              object, but otherwise are different.
                              Storage descriptor identifiers
                              (sdid_t) are a public interface to
                              the data within storage descriptors.
                              They are usually obtained from the
                              event handling routines. (Storage
                              descriptor identifiers consist of
                              enumerated types and unique keys for
                              each object (see config.h.) as below.
                              The fields which uniquely identify a
                              storage descriptor are the sdi_type,
                              sdi_key, and sdi_ctime.
                    typedef struct storage_descriptor_id {
                    struct storage_descriptor_id *sdi_next;
                    char                    *sdi_name;
                    char                    *sdi_setname;
                    u_longlong_t            sdi_user;
                    mdsdtyp_t               sdi_type;
                    u_longlong_t            sdi_key;
                    time_t                  sdi_ctime;
                    } sdid_t;
                    Storage descriptor types are described by
                    one of the following enumerated values.
                    typedef enum md_storage_descriptor_type {
MDSD_UNK = SDTYP_UNK,   /*explicit illegal value*/
MDSD_USER,              /*user-specified storage type*/
MDSD_UNSPEC,            /*unspecified storage type*/
MDSD_STRIPE,            /*block interleave/append*/
MDSD_MIRROR,            /*block replication*/
MDSD_RAID5,             /*striped parity*/
MDSD_TRANS,             /*transacting device*/
MDSD_REPLICA,           /*data base replica*/
MDSD_HSP,               /*hot spare pool*/
MDSD_HS,                /*hot spare member*/
MDSD_RESERVED,          /*unavailable for use*/
MDSD_SET,               /*administrative collection*/
MDSD_HOST,              /* hosts able to own the set*/
MDSD_MEDIATOR           /* arbitrator*/
} mdsdtyp_t;
```

The objects described are all constructed pseudo-devices which provide a class of storage (ie. mirrored) or administratively-related entities.

| RETURN VALUES | Except for cfg_cmp_sdid, as described above, these functions return 0 upon success. Upon error, an errno is returned, as in intro (2). ep is filled in with the error information. |
|---|---|

The following functions convert opaque objects to a readable format:

| NAME | cfg_get_text_sd, cfg_destroy_text_sd, - allocate and deallocate textual storage descriptors text |
|---|---|
| SYNOPSIS | #include <config.h><br>int<br>cfg_get_text_sd(void<br>*storage_descriptor_p, sdtext_t<br>**sdtpp)<br>int<br>cfg_destroy_text_sd(sdtext_t *sdtp) |
| DESCRIPTION | These routines allocate and deallocate textual storage descriptors, respectively. Textual storage descriptors are printable versions of the information packeted within storage descriptors, which are themselves described in cfg_getsd_by_id. |
| ARGUMENTS | storage_descriptor_p<br>    This is a pointer to a storage descriptor as returned by cfg_getsd_by_id ( ) or cfg_getsd_by_setname ( ).<br>sdtpp<br>    This is the address of a pointer to a textual storage descriptor.<br>typedef struct storage_descriptor_text_t {<br>char *storage_allocator_name;<br>char *name;<br>char *type;<br>char **attr;<br>char **components;<br>storage_allocator_name<br>    is set to the identity of the storage manager. The DiskSuite ™ implementation of the storage manager independent configuration interface translator and method of the present invention available from Sun Microsystems, Inc. sets this string to "DiskSuite".<br>name is the pathname of this device in the file system tree.<br>type is a string identifying the device, such as "mirror" or "RAID5."<br>attr is a vector of attributes (which may be NULL) set to the strings "error", "owned" or "toplevel."<br>components<br>    is a vector of component names. These are usually, but are not required to be, sub-devices such as c0t1d0s1. |
| RETURN VALUES | Upon success, these routines return 0. Otherwise an error is returned. |

The following functions are event related:

| NAME | cfg_ev_create, cfg_ev_get, cfg_ev_put, cfg_ev_off - register to obtain event notification, collect events, send events and turn off event collection |
|---|---|
| SYNOPSIS | #include <config.h><br>int<br>cfg_ev_create(char *qname, int flags)<br>int<br>cfg_ev_off(char *qname)<br>int<br>cfg_ev_get(<br>char    *qname,<br>void    *sdp,<br>int    wait,<br>sdid_t    *sdidp<br>)<br>int3<br>cfg_ev_put(sdid_t *sdidp) |
| DESCRIPTION | These functions register to collect, send and receive configuration events.<br>cfg_ev_create ( )<br>    is used to register to collect events in the named event notification queue qname. Its behavior is modified<br>CFG_EV_PERM<br>    This flag indicates that the named queue will not be destroyed automatically on process exit.<br>CFG_EV_EXISTERR<br>    This flag indicates that it is not an error for a user to attempt to create an event notification queue that already exists. If this flag is not |

|   |   |
|---|---|
|   | set, and the named queue does exist, the errno EEXIST will be returned. |
|   | cfg_ev_off ( ) |
|   |     unregisters event collection and causes the named queue to be deleted. |
|   | cfg_ev_get ( ) |
|   |     returns the appropriate sdid within the address of the sdid_t for all events that are in the named queue. If no events are present then this routine will either block or return without setting sdidp according to whether the wait argument is TRUE (non-zero) or FALSE (zero), respectively. |
|   | cfg_ev_put ( ) |
|   |     may be used to send user-specified events. User data may be sent in the sdi_user field of the sdid_t. |
| RETURN VALUES | Upon success, the number of events collected or sent are returned by cfg_ev_get( ) or cfg_ev_put( ). cfg_ev_create ( ) and cfg_ev_off ( ) return 0 on success or errno to indicate failure. Errors are indicated by a negative value. The absolute value of this will be an errno, as in intro(2). |

As has been shown, the storage manager independent configuration interface translator and method of the present invention herein disclosed first determines what sets or groups of storage devices are available for use and then determines what storage descriptors are in use in those particular sets. Since the storage descriptors are opaque, an accessor function is utilized to get inside of them. The opaque structures are then converted to a non-opaque format text which can be utilized by CLI and GUI tools. The present invention also provides a notification mechanism that presents information about devices which have changed while in use.

While there have been described above the principles of the present invention in conjunction with specific operating systems and drivers, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for computer mass storage management in a computer system having an operating system and physical storage devices that are operatively controlled by mass storage device drivers, said mass storage device drivers being operatively controlled by metadrivers, said method comprising the steps of:

providing at least one user interface;

providing a generic storage manager library configuration block that is both storage manager independent and software release independent, said library configuration block interfacing with said operating system, and receiving inputs from and passing outputs to said at least one user interface;

providing a metadisk driver coupled intermediate said library configuration block and said metadrivers;

providing a database associated with said metadisk driver, said database containing information corresponding to said physical storage devices;

providing for requesting an opaque listing of said physical storage devices from said metadisk driver and said database by a given user of said computer system using said at least one user interface;

providing for determining a subset of said opaque listing of said physical storage devices meeting a preselected search criteria defined by said given user of said computer system;

providing for converting said subset of said opaque listing of said physical devices to a non-opaque format listing; and providing for presenting said non-opaque format listing to said given user of said computer system by way of said at least one user interface.

2. The method of claim 1 wherein said at least one user interface is selected from the group command line interface and graphical user interface.

3. The method of claim 1 including the step of:

providing for notifying users of said computer system of any status change of said physical storage devices through said non-opaque format listing and by way of said at least one user interface.

4. A computer program product having a computer useable medium with computer readable code embodied therein, said computer usable medium for use in implementing computer mass storage management in a computer system, said computer system having an operating system, at least one user interface, physical mass storage devices that are controlled by device drivers, metadrivers that control said device drivers, a metadisk driver that controls said metadrivers, and a database that is associated with said metadisk driver and contains information corresponding to said physical mass storage devices, said computer readable codes devices comprising:

first computer readable program code devices to effect providing a generic library configuration block between said metadisk driver and said at least one user interface, said library configuration block being operating system independent, said library configuration block receiving user inputs from said at least one user interface, and said library configuration block passing outputs to said at least one user interface;

second computer readable program code devices configured to enable said at least one user interface to effect requesting an opaque listing of said physical mass storage devices from said metadisk driver and said database;

third computer readable program code devices configured to enable said at least one user interface to effect determining a subset of said opaque listing of physical mass storage devices in accordance with a search criteria that is selected by a user of said computer system;

fourth computer readable program code devices configured to effect converting said subset of said opaque listing of physical mass storage devices to a non-opaque format listing; and fifth computer readable program code devices configured to cause said at least one user interface to effect presenting said non-opaque format listing to said user.

5. The computer program product of claim of claim 4 wherein said at least one user interface is selected from the group command line interface and graphical user interface.

6. The computer program product of claim 4 further comprising:

sixth computer readable program code devices configured to enable said at least one user interface to effect notifying said user of any status change of said physical mass storage devices by way of said non-opaque format listing.

7. The computer program product of claim of claim 6 wherein said at least one user interface is selected from the group command line interface and graphical user interface.

8. A system for the management of physical mass storage devices in a computer system having an operating system, a metadisk driver that operatively controls underlying metadrivers that operatively control underlying mass storage device drivers that operatively control underlying physical mass storage devices, said system comprising:

a database associated with said metadisk driver, said database containing information corresponding to said physical mass storage devices;

a library configuration block in operative association with said operating system, said library configuration block being coupled to said metadisk driver through said operating system;

at least one user interface block coupled to said library configuration block for providing data input thereto and receiving data output therefrom; and said library configuration block being responsive to data input from said at least one user interface and operating to request an opaque listing of said physical mass storage devices, determine a subset of said opaque listing meeting a search criteria according to said data input, convert said subset of said opaque listing to a non-opaque format listing, and provide said non-opaque format listing as data output to said at least one user interface block.

9. The system of claim 8 further comprising:

a notify block in operative association with said metadisk driver for providing information to said metadisk driver regarding changes in status of said physical mass storage devices for presentation to said library configuration block and for presentation as output data to said at least one user interface.

10. The system of claim 8 wherein said opaque listing comprises at least one storage descriptor.

11. The system of claim 10 wherein said at least one storage descriptor further comprises at least one non-opaque storage descriptor identifier.

\* \* \* \* \*